(12) United States Patent
Menzel et al.

(10) Patent No.: US 9,980,623 B2
(45) Date of Patent: May 29, 2018

(54) CLEANING TROLLEY

(75) Inventors: Matthias Menzel, Langenfeld (DE);
Stefan Rutschmann, Düsseldorf (DE);
Enzo Dario Sforza, Düsseldorf (DE);
Stephan Uhl, Monheim (DE);
Klaus-Günter Hub, Idar Oberstein (DE); Martin Stuetzel, Idar Oberstein (DE)

(73) Assignee: Ecolab USA Inc., St. Paul, MN (US)

( * ) Notice: Subject to any disclaimer, the term of this patent is extended or adjusted under 35 U.S.C. 154(b) by 979 days.

(21) Appl. No.: 13/124,054

(22) PCT Filed: Nov. 5, 2008

(86) PCT No.: PCT/EP2008/065023
§ 371 (c)(1),
(2), (4) Date: Apr. 13, 2011

(87) PCT Pub. No.: WO2010/051841
PCT Pub. Date: May 14, 2010

(65) Prior Publication Data
US 2011/0198974 A1    Aug. 18, 2011

(51) Int. Cl.
*A47L 13/51* (2006.01)
*F16B 12/26* (2006.01)
(Continued)

(52) U.S. Cl.
CPC ............. *A47L 13/51* (2013.01); *A47B 81/02* (2013.01); *B62B 3/02* (2013.01); *F16B 12/125* (2013.01);
(Continued)

(58) Field of Classification Search
CPC ........ A47L 13/51; F16B 12/26; F16B 12/125; A47B 81/02; B62B 3/02; B62B 2202/50;
(Continued)

(56) References Cited

U.S. PATENT DOCUMENTS

| 571,133 A | * | 11/1896 | Hoffman | ............. | E05D 11/1078 |
| | | | | | 16/303 |
| 1,984,918 A | * | 12/1934 | Coder | .................... | B60D 1/065 |
| | | | | | 280/477 |

(Continued)

FOREIGN PATENT DOCUMENTS

| DE | 3141495 A1 | 5/1983 |
| DE | 4322626 A1 | 1/1995 |

(Continued)

*Primary Examiner* — Bryan Evans
(74) *Attorney, Agent, or Firm* — Shumaker & Sieffert, P.A.

(57) ABSTRACT

The present invention refers to a cleaning trolley comprising a base plate supported by rolling members; at least four upright hollow profiles for fixing cross walls arranged on the base plate, wherein each cross wall consists of two separate wall elements removably arranged back-to-back to each other and fixed by said upright hollow profiles; and an upper frame for securing the at least four upright hollow profiles. Further, the invention provides a cleaning trolley comprising a primary section and a secondary section, each section having a base plate supported by rolling members, wherein the primary section and the secondary section are removably connected by a connection mechanism, which connection mechanism contains a pedal pivotably attached to the bottom side of the base plate of the secondary section, and its actuation releases claws which in connection position are engaged with the primary section.

13 Claims, 7 Drawing Sheets

(51) Int. Cl.
   *B62B 3/02*     (2006.01)
   *A47B 81/02*    (2006.01)
   *F16B 12/12*    (2006.01)
   *E05D 5/02*     (2006.01)

(52) U.S. Cl.
   CPC .......... *F16B 12/26* (2013.01); *B62B 2202/50* (2013.01); *E05D 5/023* (2013.01); *E05Y 2900/20* (2013.01); *E05Y 2900/60* (2013.01)

(58) Field of Classification Search
   CPC ... B62B 2207/00; B62B 9/28; E05Y 2900/20; E05Y 2900/60; E05D 5/023; E05D 2202/50
   USPC ............ 280/47.11, 47.34, 47.35, 79.11, 79.3
   See application file for complete search history.

(56) References Cited

U.S. PATENT DOCUMENTS

| | | | |
|---|---|---|---|
| 4,263,738 A * | 4/1981 | Donatelle | G09F 15/0012 40/606.18 |
| 4,404,704 A | 9/1983 | Rabban | |
| 4,986,555 A | 1/1991 | Andreen | |
| 5,138,743 A * | 8/1992 | Hoffman | E05F 1/1223 16/303 |
| 5,647,650 A * | 7/1997 | Daugherty et al. | 312/265.1 |
| 5,704,094 A * | 1/1998 | Hartigan | H04M 1/0214 16/277 |
| 5,913,528 A | 6/1999 | Kresse et al. | |
| 5,975,544 A | 11/1999 | Kresse et al. | |
| 6,070,808 A | 6/2000 | Kildow | |
| 6,152,672 A * | 11/2000 | Alson | 414/406 |
| 6,250,843 B1 * | 6/2001 | Olson et al. | 403/381 |
| 6,497,423 B1 | 12/2002 | Perelli et al. | |
| 6,502,838 B1 | 1/2003 | Kresse et al. | |
| 6,682,255 B2 * | 1/2004 | Battaglia et al. | 403/381 |
| 6,974,140 B2 * | 12/2005 | Neuman | 280/79.11 |
| 7,104,556 B1 | 9/2006 | Young | |
| D533,705 S | 12/2006 | Bertucci et al. | |
| 7,200,224 B2 * | 4/2007 | Park | H04M 1/022 379/428.01 |
| D555,869 S | 11/2007 | Zorzo | |
| D555,870 S | 11/2007 | Zorzo | |
| D556,416 S | 11/2007 | Zorzo | |
| D556,417 S | 11/2007 | Zorzo | |
| D556,418 S | 11/2007 | Zorzo | |
| D558,949 S | 1/2008 | Zorzo | |
| 2002/0109318 A1 | 8/2002 | Calmeise et al. | |
| 2004/0262867 A1 | 12/2004 | Arceta et al. | |
| 2005/0011037 A1 | 1/2005 | Zhao et al. | |
| 2006/0053579 A1 | 3/2006 | Bruno | |
| 2006/0103094 A1 * | 5/2006 | Wiff et al. | 280/79.11 |
| 2006/0163827 A1 | 7/2006 | Lauer et al. | |
| 2007/0267832 A1 | 11/2007 | Denissov | |
| 2007/0289788 A1 | 12/2007 | Salmon | |
| 2008/0029981 A1 | 2/2008 | Dukes | |
| 2008/0111329 A1 * | 5/2008 | Brown | B60D 1/00 280/33.997 |

FOREIGN PATENT DOCUMENTS

| | | | |
|---|---|---|---|
| DE | 4407014 A1 | 9/1995 | |
| DE | 19504771 C2 | 1/1998 | |
| DE | 19944955 A1 | 4/2000 | |
| DE | 10003138 C1 | 5/2001 | |
| DE | 20306728 U1 | 9/2003 | |
| DE | 20303477 U1 | 4/2004 | |
| DE | 202004003525 U1 | 7/2004 | |
| DE | 202005008791 U1 | 11/2006 | |
| DE | 102005044984 B3 | 1/2007 | |
| EP | 452674 B1 | 3/1991 | |
| EP | 570900 A1 | 5/1993 | |
| EP | 742692 B1 | 2/1995 | |
| EP | 746490 B1 | 2/1995 | |
| EP | 801925 B1 | 5/1996 | |
| EP | 878374 | 5/1998 | |
| EP | 1013214 A1 | 6/2000 | |
| EP | 1053926 A2 | 11/2000 | |
| EP | 1053926 A3 | 11/2000 | |
| EP | 1261516 B1 | 3/2001 | |
| EP | 1184578 A3 | 3/2002 | |
| EP | 1190664 A3 | 3/2002 | |
| EP | 1035795 B1 | 5/2002 | |
| EP | 1279582 A1 | 1/2003 | |
| EP | 1437283 B1 | 1/2003 | |
| EP | 1336463 A1 | 2/2003 | |
| EP | 1494571 A1 | 4/2003 | |
| EP | 1374751 B1 | 6/2003 | |
| EP | 1512606 A1 | 9/2003 | |
| EP | 1374751 A2 | 1/2004 | |
| EP | 1374751 A3 | 1/2004 | |
| EP | 1374751 A8 | 3/2004 | |
| EP | 1454809 B1 | 3/2004 | |
| EP | 1036723 B1 | 8/2005 | |
| EP | 1512606 B1 | 9/2006 | |
| EP | 1849393 B1 | 5/2010 | |
| FR | 2748440 | 6/1996 | |
| GB | 2264088 | 8/1993 | |
| GB | 2355754 | 5/2001 | |
| GB | 2383980 | 7/2003 | |
| GB | 238577 | 11/2003 | |
| GB | 2388156 A | 11/2003 | |
| JP | 2009040387 A * | 2/2009 | ............... B62B 1/12 |
| WO | WO1991/011952 A1 | 8/1991 | |
| WO | WO1995/000063 A1 | 1/1995 | |
| WO | WO1999/000050 A1 | 1/1999 | |
| WO | WO1999/023931 A1 | 5/1999 | |
| WO | WO1999/065710 A1 | 12/1999 | |
| WO | WO2000/054646 A3 | 9/2000 | |
| WO | WO2001/044035 A1 | 6/2001 | |
| WO | WO2001/066408 A1 | 9/2001 | |
| WO | WO2002/051686 A1 | 7/2002 | |
| WO | WO2003/088803 A1 | 10/2003 | |
| WO | WO2006/053079 A1 | 5/2006 | |
| WO | WO2006/078947 A2 | 7/2006 | |
| WO | WO2006/078947 A3 | 7/2006 | |
| WO | WO2007/033724 A1 | 3/2007 | |

* cited by examiner

CLEANING TROLLEY

CROSS-REFERENCES TO RELATED APPLICATIONS

This application claims the benefit of World Intellectual Property Organization (WIPO) International Application Number PCT/EP2008/065023, filed on Nov. 5, 2008.

The present invention relates generally to cleaning trolleys and, in particular to such cleaning trolleys which are configured to transport utensils for cleaning.

Cleaning trolleys are known in the art and have found wide application in commercial cleaning and maintenance functions. However, the cleaning trolleys according to the state of art are not easily adaptable to the customers purposes, difficult to handle and they are bulky.

One object of the present invention was to construct a cleaning trolley which is easily adaptable to the customers purposes.

Another object of the present invention was to provide a cleaning trolley having a modular design, comprising at least two units each of which are mobile independently from each other and may be easily connected to and disconnected from each other.

A further object of the present invention was to provide a novel and inventive hinge, in particular for the use for lateral doors for cleaning trolleys, which avoid a bulky design of a cleaning trolley and facilitates its handling, when used for the equipment of said cleaning trolleys with lateral doors.

SUMMARY OF THE INVENTION

In the first aspect of the present invention a cleaning trolley is provided comprising a base plate supported by rolling members; at least four upright hollow profiles for fixing cross walls arranged on the base plate, wherein each cross wall consists of two separate wall elements removably arranged back-to-back to each other and fixed by said upright hollow profiles; and an upper frame for securing the at least four upright hollow profiles.

The rolling members may be casters or wheels or the like.

The first embodiment of the present invention thereby provides a cleaning trolley which is constructed in that way that it may be easily adapted to the customer's needs and purposes. Namely, when assembling the cross walls one may choose different designs of the inner and outer surface by selecting from a series of different wall elements.

In a preferred embodiment of the cleaning trolley of the present invention the wall elements comprise two opposed edges each provided with reduced thickness and a terminal beaded edge for insertion into the hollow profile, wherein the hollow profile has a groove which matches with the shape of the edges of two wall elements arranged back-to-back to each other.

Further preferred the wall elements are selected from the group comprising i) wall element having a plurality of rails for guiding drawers, which rails are integral with the wall element; ii) wall element having one or more seats for inserting by sliding or snap-in a support plate comprising a hook, a handle, a clamp for holding a mop handle, connection element; iii) wall element having a planar surface. These features of a preferred embodiment of the present invention allow to adapt the cleaning trolley according to the needs of the customer or the cleaning personnel. Particularly, the wall element having one or more seats for inserting by sliding or snap-in a support plate comprising a hook, a handle, a clamp for holding a mop handle, connection element is suitable for quick adaptation to current practical needs.

In a typical preferred embodiment of the cleaning trolley of the present invention comprises at least two wall elements having a plurality of rails for guiding drawers are arranged for forming a drawer cabinet, as well as wall elements having one or more seats for inserting by sliding or snap-in a support plate comprising a hook, a handle, a clamp for holding a mop handle, connection element, wherein the surface provided with said seats is facing to the outside.

Further preferred, the cleaning trolley according to the present invention comprises a system of elements to be fixed to the wall element or upper frame, which elements to be fixed have a support plate to be inserted into a seat arranged on the surface of the wall element or upper frame; which element to be fixed match with said seat and provide features selected from the group: flat surface, hook, handle, clamp for holding a mop handle, hinge for a lid, fastening for an upper lid assembly, connection element. The element to be fixed having a flat surface serves the purpose to cover a seat provided in a wall element, if this seat is not presently used. This avoids accumulation of soil and facilitates cleaning and disinfection of the cleaning trolley.

Preferably, the elements to be fixed having a support plate are further comprising a tongue arranged along one edge of the support plate for insertion into a slot arranged in the seat.

Further preferred, the elements to be fixed having a support plate are further comprising a drop-in pin arranged at the back of the support plate for a snap-fit insertion into a hole arranged in the seat.

In a preferred embodiment the seats comprise a slot for insertion of a tongue of the support plate and/or comprise a hole for insertion of a drop-in pin for a snap-fit insertion into said hole arranged at the back of the support plate.

In a further preferred embodiment of the present invention the elements to be fixed have guides for sliding insertion of other support plates or of link plates for fixing the upper lid assembly, the handle bar, a hook, a handle, a clamp for holding a mop handle, connection element.

Further preferred, the elements to be fixed having a support plate further can be secured by a screw.

In a further aspect of the present invention the cleaning trolley is provided with wall elements having a plurality of rails for guiding drawers, wherein two wall elements are forming a vertical section of a plurality of drawers arranged one above each other. The cleaning trolley may have one, two or more of said vertical sections next to each other. Preferably, the cleaning trolley comprises drawers selected from the group consisting of tablets, first drawer, second drawer having 1.5 to 2.0 fold of the height of a first drawer; third drawer having smaller height than the first drawer. Further preferred, the plurality of rails for guiding drawers allows to equip a vertical section of a plurality of drawers arranged one above each other with the following combinations: a) up to four first drawers; b) two second drawers; c) one second drawer and one or two first drawers, in any order. The preferred embodiment described allows an optimal and flexible utilization of the space provided in the body of the cleaning trolley according to the present invention, by being able to use drawers of different sizes (height), with the same set of rails.

For example the cleaning trolley may comprise two cross walls thereby providing a body for one vertical section of drawers; or three cross walls thereby providing a body for two vertical sections of drawers located next to each other;

or may comprise four cross walls thereby providing a body for three vertical sections of drawers located next to each other and so on.

In a further preferred aspect of the present invention the cleaning trolley comprises lateral doors with hinges comprising a fixed hinge leaf and a moving hinge leaf, which hinges are self-closing and are providing two rest positions separated from each other by 180°.

These features allows to provide the cleaning trolley with lateral doors which avoid a bulky design of a cleaning trolley and facilitates its handling during use. Due to the hinges constructed according to the present invention the lateral door(s) of the cleaning trolley is/are either completely shut or completely open. According to the invention the doors will automatically move to either one of these two rest positions: completely shut or completely open. In the completely open position the respective lateral door will be in a position essentially parallel to the side of the cleaning trolley. Thereby a bulky design is avoided and the cleaning trolley is easier to handle for example when being moved trough doors.

In a preferred embodiment two rest positions of the hinges are determined by an uneven profile of the support flange from which the hinge pin of the fixed hinge leaf protrudes and by the uneven profile of the rim surrounding the hinge hole of the hinge pin bushing of the moving hinge leaf; wherein said two uneven profiles contain two opposite lowest points separated by peaks. Preferably, said two uneven profiles are substantially complementary to each other and provide a mating interface. Further preferred, the uneven profile of the support flange and the uneven profile of the rim surrounding the hinge hole each is a weavy or a sine-shaped profile.

In a further preferred embodiment the fixed hinge leaf comprise a flat section with a drop-in pin for a snap-fit insertion into a hole of the hollow profile. Preferably, the fixed hinge leaf comprises a flat section with an extension on the side opposed to the side where the hinge pin is arranged, which extension is having the shape of a cramp for an enveloping grip with the edge of the rectangular hollow profile.

In a particularly preferred embodiment the moving hinge leaf is integral with the door.

In a further aspect of the present invention the cleaning trolley is having a handle bar which is provided with one or more support plates for sliding into guides or with drop-in pin for a snap-fit insertion in order to removably attach the handle bar to a wall element, which wall element is provided with guides to insert said plate or provided with seats and holes to insert said drop-in pin, respectively. This feature allows to easily move the handle bar to either end of the cleaning trolley or in case of a modular design to move the handle bar to the suitable section or module of the cleaning trolley.

Preferably, the handle bar is further provided with one or more braces also provided with plates for sliding into guides or is provided with drop-in pin for a snap-fit insertion for removable attachment to a wall element.

Further preferred, the braces can be provided with further hand grips at any position along the braces, preferably in a height of from 50 to 200 cm, even further preferred in a height of from 80 to 130 cm above floor level.

In a further preferred embodiment the handle bar also provides seat for the attachment of hook, holder or handle by sliding insertion or snap-fit insertion.

In a further aspect of the present invention the upper frame is provided with an upper lid assembly comprising a frame and horizontally arranged sliding lids connected thereto for covering the top side of the trolley.

Further preferred the cleaning trolley is provided with one or more plates with holes for inserting bottles or buckets or other utensils. Said plates are fixed to the upper frame by snap-in fastening elements.

In a particularly preferred embodiment of the present invention the cleaning trolley is comprising a primary section and a secondary section, each section having a base plate supported by rolling members, wherein the primary section and the secondary section are removably connected by a connection mechanism, which connection mechanism contains a pedal pivotably attached to the bottom side of the base plate of the secondary section, and its actuation releases claws which in connection position are engaged with the primary section.

This preferred embodiment of the present invention provides a cleaning trolley having a modular design and comprises at least two units each of which is mobile independently from each other and may be easily connected to and disconnected from each other.

In a preferred embodiment said connection mechanism contains a pedal pivotably attached to the bottom side of the base plate of the secondary section, a further pedal-like element pivotally attached to the bottom side of the base plate of the secondary section and provided with a first claw, which in connection position is engaged with the primary section; wherein the pedal-like element is further connected to a vertically attached actuation rod which again is connected to a pivotally attached second claw, which in connection position is also engaged with the primary section, wherein the claws are arranged at the cross wall of the secondary section which is located opposite to the cross wall where the pedal is arranged.

In a further preferred embodiment the connection mechanism can be released by actuation of said pedal which actuates said pedal-like element and releases the engagement of the first claw of the pedal-like element, and the actuation of the pedal-like element is further translated into a vertical down-movement of said vertically attached actuation rod, thereby releasing the second claw from its engagement position with the primary section.

Further preferred, the primary section or the secondary section is provided with a waste bucket or waste bag or laundry bag.

In a further preferred embodiment the cleaning trolley further comprises one or more connection elements for removably connecting two or more primary sections with each other or secondary sections with each other, preferably that section which is provided with a waste bucket or waste bag or laundry bag. The advantage of this feature is that one section of the cleaning trolley can be disconnected from the other section and that the sections provided with a waste bucket or waste bag or laundry bag can be connected with each other and be transported to a different location, while the other section which is equipped with cleaning utensils remains or is moved to the location where cleaning is carried out.

Further preferred, the cleaning trolley further comprises a third section having a base plate supported by rolling members, wherein the third section and the primary section are removably connected; and wherein the third section is adapted for carrying a mop bucket and optionally a wringer.

It is particularly preferred that the elements selected from the group consisting of base plate, hollow profiles, upper frame, pedal, pedal-like element, handle bar, braces, lateral door, plurality of rails for guiding drawers, drawers, tablets, upper lid assembly, bucket, wall element, cross wall, reduced thickness of the wall element, terminal beaded edge of the wall element, element to be fixed and all of its elements like support plate, hook, tongue, drop-in pin, the hinge and all of its elements like fixed hinge leaf, flat section, extension, hinge pin, moving hinge leaf, support flange, rim of the hinge hole, hinge pin bushing, support or link plates, sliding lids are made of plastic material, preferably all of them are made of plastic material.

The second object of the present invention is solved by a cleaning trolley comprising a primary section and a secondary section, each section having a base plate supported by rolling members, wherein the primary section and the secondary section are removably connected by a connection mechanism, which connection mechanism contains a pedal pivotably attached to the bottom side of the base plate of the secondary section, and its actuation releases claws which in connection position are engaged with the primary section.

Therefore the present invention provides a cleaning trolley having a modular design which comprises at least two units each of which is mobile independently from each other and may be easily connected and disconnected.

In a preferred embodiment said connection mechanism contains a pedal pivotably attached to the bottom side of the base plate of the secondary section, a further pedal-like element pivotally attached to the bottom side of the base plate of the secondary section and provided with a first claw, which in connection position is engaged with the primary section; wherein the pedal-like element is further connected to a vertically attached actuation rod which again is connected to a pivotally attached second claw, which in connection position is also engaged with the primary section, wherein the claws are arranged at the cross wall of the secondary section which is located opposite to the cross wall where the pedal is arranged.

Further preferred, said connection mechanism can be released by actuation of said pedal which actuates said pedal-like element and releases the engagement of the first claw of the pedal-like element, and the actuation of the pedal-like element is further translated into a vertical downmovement of said vertically attached actuation rod, thereby releasing the second claw from its engagement position with the primary section.

Even further preferred the primary section or the secondary section is provided with a waste bucket or waste bag or laundry bag. In a further preferred embodiment the cleaning trolley comprises one or more connection elements for removably connecting two or more primary sections with each other or secondary sections with each other, preferably that section which is provided with a waste bucket or waste bag or laundry bag.

In a further aspect of the present invention each of the primary section and the secondary section comprises at least four upright hollow profiles for fixing cross walls arranged on the base plate, wherein each cross wall consists of two separate wall elements removably arranged back-to-back to each other and fixed by said upright hollow profiles; and an upper frame for securing the at least four upright hollow profiles.

Further preferred, the wall elements comprise two opposed edges each provided with reduced thickness and a terminal beaded edge for insertion into the hollow profile, wherein the hollow profile has a groove which matches with the shape of the edges of two wall elements arranged back-to-back to each other.

Preferably, the wall elements are selected from the group comprising i) wall element having a plurality of rails for guiding drawers, which rails are integral with the wall element; ii) wall element having one or more seats for inserting by sliding or snap-in a support plate comprising a hook, a handle, a clamp for holding a mop handle, connection element for connection one or more of the primary section or one or more of the secondary section side by side to each other; iii) wall element having a planar surface.

Further preferred, in the primary section and/or the secondary section, at least two wall elements having a plurality of rails for guiding drawers are arranged for forming a drawer cabinet, as well as wall elements having one or more seats for inserting by sliding or snap-in a support plate, wherein the surface provided with said seats is facing to the outside.

In a preferred embodiment the cleaning trolley comprises a system of elements to be fixed to the wall element or upper frame, which elements to be fixed have a support plate to be inserted into a seat arranged on the surface of the wall element or upper frame; which element to be fixed match with said seat and provide features selected from the group: flat surface, hook, handle, clamp for holding a mop handle, hinge for a lid, fastening for an upper lid assembly, connection element for connection one or more of the primary section or one or more of the secondary section side by side to each other.

Preferably, the elements to be fixed having a support plate are further comprising a tongue arranged along one edge of the support plate for insertion into a slot arranged in the seat.

It is preferred that the elements to be fixed having a support plate are further comprising a drop-in pin arranged at the back of the support plate for a snap-fit insertion into a hole arranged in the seat.

Further preferred, the seats comprise a slot for insertion of a tongue of the support plate and/or comprise a hole for insertion of a drop-in pin for a snap-fit insertion into said hole arranged at the back of the support plate.

Preferably, the elements to be fixed have guides for sliding insertion of other support plates or of link plates for fixing the upper lid assembly, the handle bar, a hook, a handle, a clamp for holding a mop handle, connection element for connection one or more of the primary section or one or more of the secondary section side by side to each other.

Further preferred, the elements to be fixed having a support plate further can be secured by a screw.

In another aspect of the present invention the primary section and/or the secondary section is provided with wall elements having a plurality of rails for guiding drawers, wherein two wall elements are forming a vertical section of a plurality of drawers arranged one above each other. The cleaning trolley may have one, two or more of said vertical sections of drawers next to each other.

Preferably, the drawers are selected from the group consisting of tablets, first drawer, second drawer having 1.5 to 2.0 fold of the height of a first drawer; third drawer having smaller height than the first drawer. Further preferred, the plurality of rails for guiding drawers allows to equip a vertical section of a plurality of drawers arranged one above each other with the following combinations: a) up to four first drawers; b) two second drawers; c) one second drawer and one or two first drawers, in any order.

For example, the primary section and/or the secondary section of the cleaning trolley each may comprise two cross walls thereby providing a body for one vertical section of drawers; or three cross walls thereby providing a body for two vertical sections of drawers located next to each other;

or may comprise four cross walls thereby providing a body for three vertical sections of drawers located next to each other and so on.

In a preferred embodiment of the present invention the cleaning trolley further comprises lateral doors with hinges comprising a fixed hinge leaf and a moving hinge leaf, which hinges are self-closing and are providing two rest positions separated from each other by 180°. Preferably, said two rest positions of the hinges are determined by an uneven profile of the support flange from which the hinge pin of the fixed hinge leaf protrudes and by the uneven profile of the rim surrounding the hinge hole of the hinge pin bushing of the moving hinge leaf; wherein said two uneven profiles contain two opposite lowest points separated by peaks. Further preferred, said two uneven profiles are substantially complementary to each other and provide a mating interface. Further preferred, the uneven profile of the support flange and the uneven profile of the rim surrounding the hinge hole each is a weavy or a sine-shaped profile.

Preferably, the fixed hinge leaf comprise a flat section with a drop-in pin for a snap-fit insertion into a hole of the hollow profile. In a further preferred embodiment the fixed hinge leaf comprises a flat section with an extension on the side opposed to the side where the hinge pin is arranged, which extension is having the shape of a cramp for an enveloping grip with the edge of the rectangular hollow profile. Further preferred, the moving hinge leaf is integral with the door.

In a further preferred embodiment of the present invention the cleaning trolley has a handle bar provided with one or more support plates for sliding into guides or with drop-in pin for a snap-fit insertion in order to removably attach the handle bar to a wall element, which wall element is provided with guides to insert said plate or provided with seats and holes to insert said drop-in pin, respectively. Preferably, the handle bar is further provided with one or more braces also provided with plates for sliding into guides or is provided with drop-in pin for a snap-fit insertion for removable attachment to a wall element.

The braces may be provided with further hand grips at any position along the braces, preferably in a height of from 50 to 200 cm, preferably in a height of from 80 to 130 cm above floor level.

Further preferred, the handle bar also provides seat for the attachment of hook, holder or handle by sliding insertion or snap-fit insertion.

In a preferred embodiment of the cleaning trolley the upper frame is provided with an upper lid assembly comprising a frame and horizontally arranged sliding lids connected thereto for covering the top side of the trolley.

Further, preferred, the cleaning trolley is provided with one or more plates with holes for inserting bottles or buckets or other utensils.

It is particularly preferred that the elements selected from the group consisting of base plate, hollow profiles, upper frame, pedal, pedal-like element, handle bar, braces, lateral door, plurality of rails for guiding drawers, drawers, tablets, upper lid assembly, bucket, wall element, cross wall, reduced thickness of the wall element, terminal beaded edge of the wall element, element to be fixed and all of its elements like support plate, hook, tongue, drop-in pin, the hinge and all of its elements like fixed hinge leaf, flat section, extension, hinge pin, moving hinge leaf, support flange, rim of the hinge hole, hinge pin bushing, support or link plates, sliding lids are made of plastic material, preferably all of them are made of plastic material.

The third object of the present invention is solved by a hinge for a door, for example for a door of a cleaning trolley or a cabinet, the hinge comprising a fixed hinge leaf and a moving hinge leaf, which hinges are self-closing and are providing two rest positions separated from each other by 180°.

Preferably, said two rest positions of the hinges are determined by an uneven profile of the support flange from which the hinge pin of the fixed hinge leaf protrudes and by the uneven profile of the rim surrounding the hinge hole of the hinge pin bushing of the moving hinge leaf; wherein said two uneven profiles contain two opposite lowest points separated by peaks.

It is preferred that said two uneven profiles are substantially complementary to each other and provide a mating interface. Further preferred, the uneven profile of the support flange and the uneven profile of the rim surrounding the hinge hole each is a weavy or a sine-shaped profile.

These features allows to provide a hinge and door which facilitates its handling during use. Due to the hinges constructed according to the present invention the door(s) is/are either completely shut or completely open. According to the invention the doors will automatically move to either one of these two rest positions: completely shut or completely open. In the completely open position the respective door will be in a position essentially parallel to the front side of for example a cabinet. In case of its use in a cleaning trolley the door will be in a position essentially parallel to the lateral side, whereby a bulky design is avoided and the cleaning trolley is easier to handle for example when being moved trough doors.

Further preferred, the moving hinge leaf is integral with the door.

Particularly preferred, the hinge and all of its elements like fixed hinge leaf, flat section, extension, hinge pin, moving hinge leaf, support flange, rim of the hinge hole, hinge pin bushing are made of plastic material, preferably all of them are made of plastic material. Preferably the door to which the hinge is connected is made of plastic material.

The present invention further will be described in more detail with reference to the figures which are not considered to limit the present invention in any way.

DESCRIPTION OF THE FIGURES

FIG. 1 is a side view of the cleaning trolley according to the present invention. The cleaning trolley 1 comprises a base plate 2 which is supported by rolling members (not shown). Upright hollow profiles 3 are arranged on the base plate 2. The upright hollow profiles 3 have the purpose to fix the cross walls (not shown). Further, an upper frame 4 for securing the upright hollow profiles is provided. The cleaning trolley shown in FIG. 1 has a modular design and comprises a primary section 5 and a secondary section 6, wherein each section is having a base plate 2 supported by rolling members (not shown). The primary section 5 and the secondary section 6 are removably connected by a connection mechanism. The connection mechanism contains a pedal 7 pivotably attached to the bottom side of the base plate 2 of the secondary section 6, a further pedal-like element 8 pivotally attached to the bottom side of the base plate 2 of the secondary section 6 and provided with a first claw (not shown). In connection position the first claw is engaged with the base plate 2 of the primary section 5. The pedal-like element 8 is further connected to a vertically attached actuation rod (not shown) which again is connected to a pivotally attached second claw (not shown), which in connection position is engaged with the upper frame 4 of the primary section 5.

Figure 1:
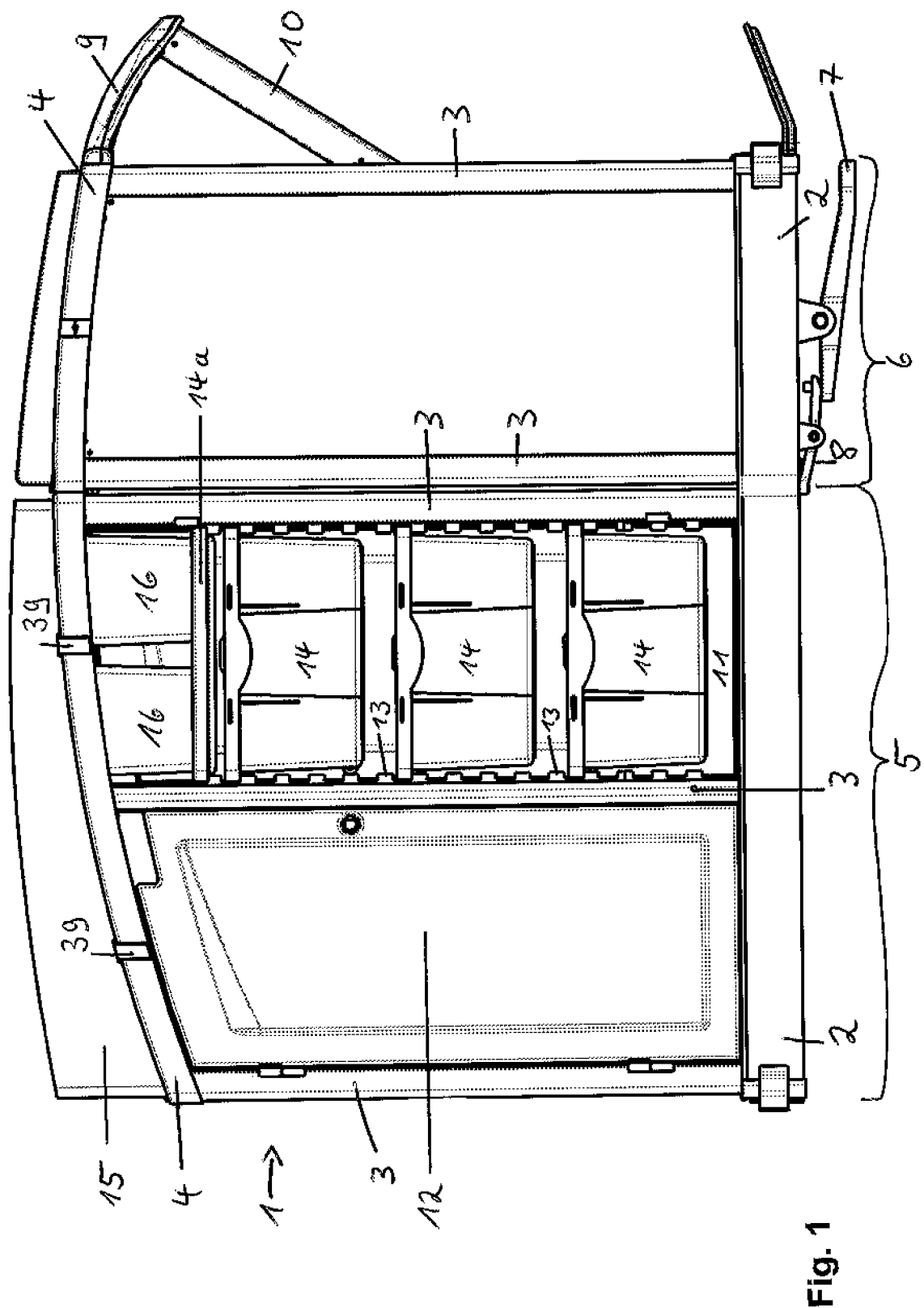
FIG. 1 is a side view of the cleaning trolley according to the present invention.

The cleaning trolley is also provided with a handle bar 9 having one or more support plates for sliding into guides or with drop-in pin for a snap-fit insertion in order to removably attach the handle bar 9 to a wall element. The handle bar 9 is further provided with one or more braces 10 also provided with plates for sliding into guides or is provided with drop-in pin for a snap-fit insertion for removable attachment to a wall element.

The cleaning trolley shown in the figure further features a drawer cabinet having two vertical sections 11 of drawers located next to each other. One section of drawers is hidden by a lateral door 12. The drawer cabinet is formed by wall elements having a plurality of rails 13 for guiding drawers 14 or tablets 14a.

The upper frame 4 is provided with an upper lid assembly 15 comprising a frame and horizontally arranged sliding lids (not shown) connected thereto for covering the top side of the trolley. The upper lid assembly 15 is connected to the upper frame 4 by support plates or link plates 39 which are inserted into seats by sliding insertion which seats are located in the upper frame 4.

The cleaning trolley shown in the figure is equipped with buckets 16 resting on a tablet 14a. The buckets 16 are accessible from the top side.

Figure 2:
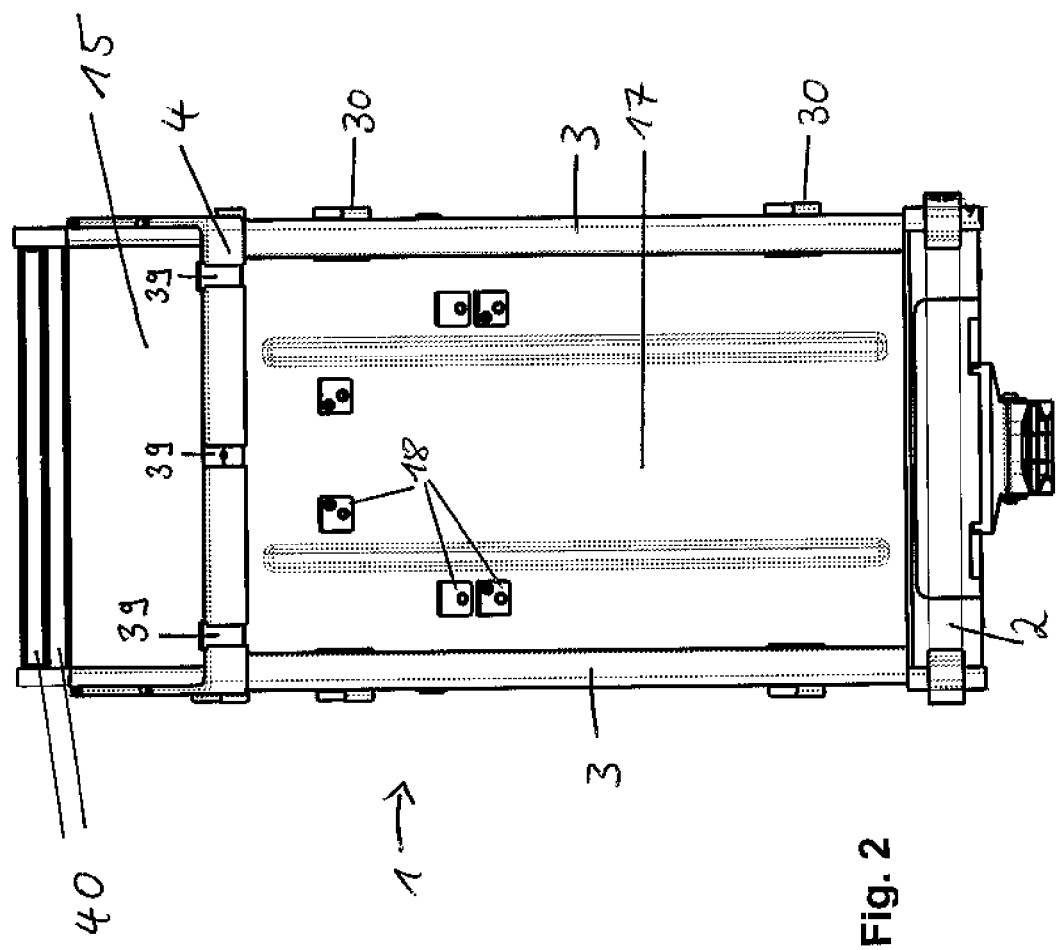
FIG. 2 shows a rear view of the cleaning trolley.

FIG. 2 shows a rear view of the cleaning trolley, where the handle bar may be attached. For attachment of the handle bar and its supporting braces the wall element 17 is provided with seats 18 for inserting the support plates of the handle bar and the braces by snap-fit insertion into the seats 18 with the help of drop-in pins.

The upper frame 4 also comprises seats for sliding insertion of support plates or link plates 39 for fixing the upper lid assembly 15 to the upper frame 4. The upper lid assembly 15 comprises sliding lids 40 covering the top side of the cleaning trolley.

Figure 3:
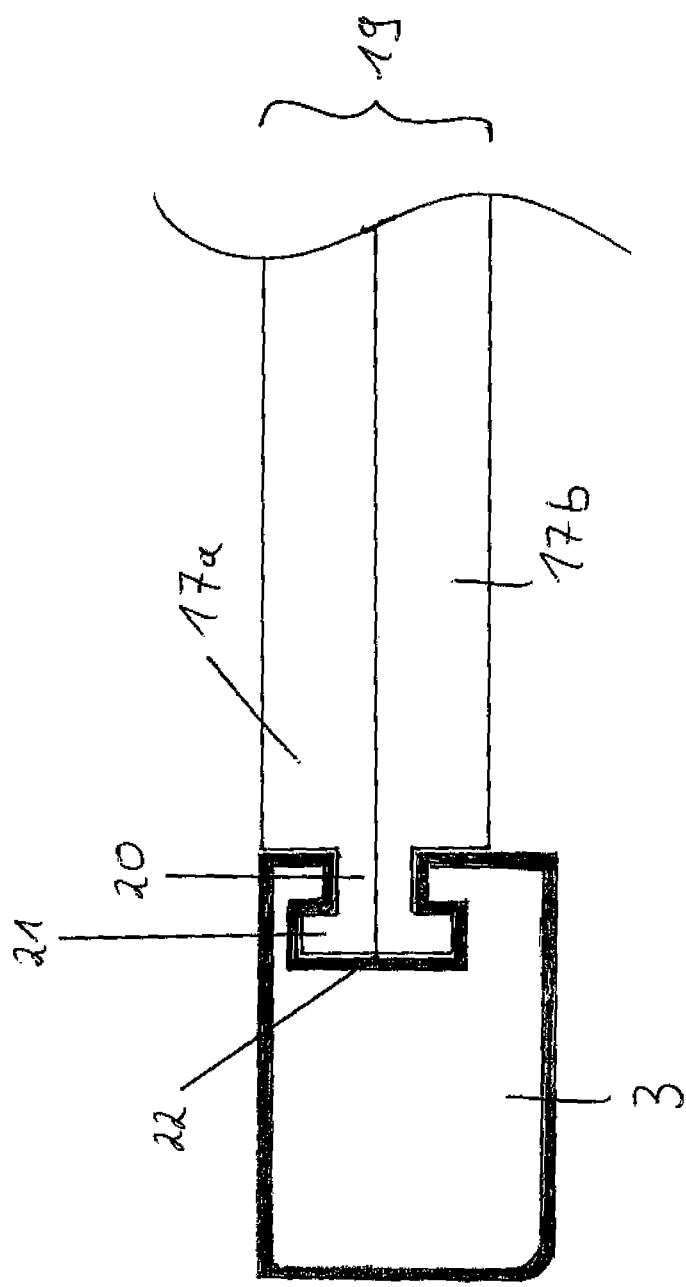
FIG. 3 shows a sectional view of a hollow profile and a cross wall.

FIG. 3 shows a cross section of a hollow profile 3 and a cross wall 19. The cross wall 19 consists of two separate wall elements 17a and 17b removably arranged back-to-back to each other and fixed by the upright hollow profiles 3. The wall elements 17a and 17b comprise two opposed edges each provided with reduced thickness 20 and a terminal beaded edge 21 for insertion into the hollow profile 3. The hollow profile 3 comprises a groove 22 which matches with the shape of the edges (area with reduced thickness 20 and terminal beaded edge 21) of two wall elements 17a and 17b arranged back-to-back to each other.

Figure 4:
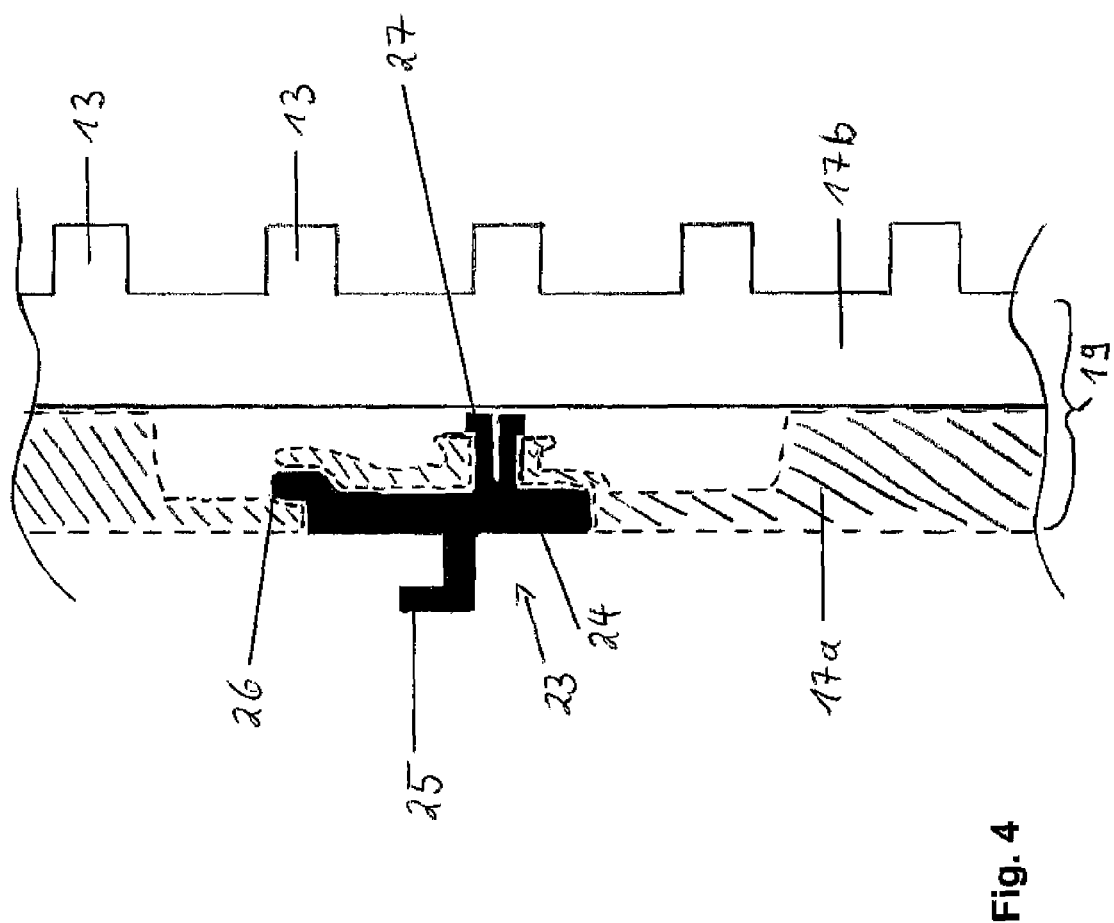
FIG. 4 shows a sectional view of a cross wall.

FIG. 4 shows a sectional view of a cross wall 19. The cross wall 19 consists of two separate wall elements 17a and 17b removably arranged back-to-back to each other. The wall element 17a has one or more seats for inserting an element to be fixed 23. The element to be fixed 23 as shown in the figure is represented by a support plate 24 and comprises a hook 25, a tongue 26 arranged along one edge of the support plate 24 for insertion into a slot arranged in the seat, as well as a drop-in pin 27 arranged at the back of the support plate for a snap-fit insertion into a hole arranged in the seat of wall element 17a. The wall element 17b is provided with a plurality of rails 13 for guiding drawers.

Figure 5:
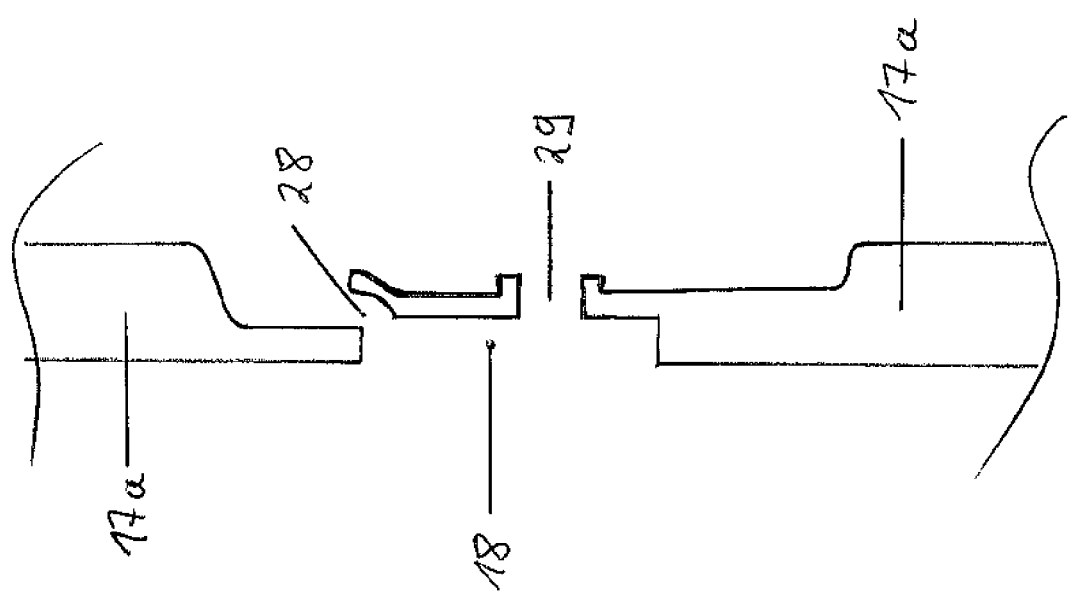
FIG. 5 shows a sectional view of the wall element shown in FIG. 4.

FIG. 5 shows a sectional view of the wall element 17a shown in FIG. 4 without the element to be fixed. The wall element 17a has one or more seats 18 for inserting an element to be fixed. The seat 18 comprises a slot 28 for the insertion of a tongue arranged along one edge of the support plate of the element to be fixed, as well as a hole 29 for the snap-in insertion of a drop-in pin arranged at the back of the support plate.

Figure 6:
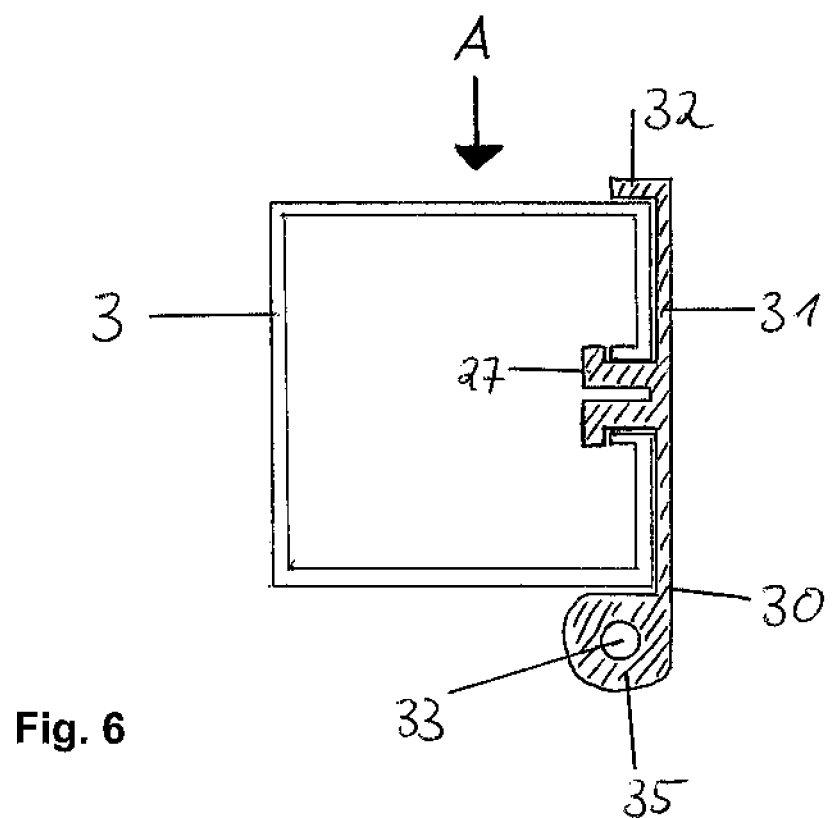
FIG. 6 shows a sectional view of a hollow profile with a hinge for the lateral doors of the cleaning trolley.

FIG. 6 shows a sectional view of a hollow profile 3 with a hinge for the lateral doors of the cleaning trolley. The hinges for the lateral doors comprise a fixed hinge leaf 30 and a moving hinge leaf (not shown). The fixed hinge leaf 30 shown in FIG. 6 comprises a flat section 31 with a drop-in pin 27 for a snap-fit insertion into a hole of the hollow profile 3. Further, the flat section 31 is provided with an extension 32 having the shape of a cramp for an enveloping grip with the edge of the rectangular hollow profile 3. The extension 32 is located on the side opposed to the side where the hinge pin 33 is arranged. The hinge pin 33 is surrounded by the support flange 35. The figure does not show the insertion of the cross wall (which however is necessarily present at the given location of this cross sectional view) and which location is indicated by arrow A.

Figure 7:
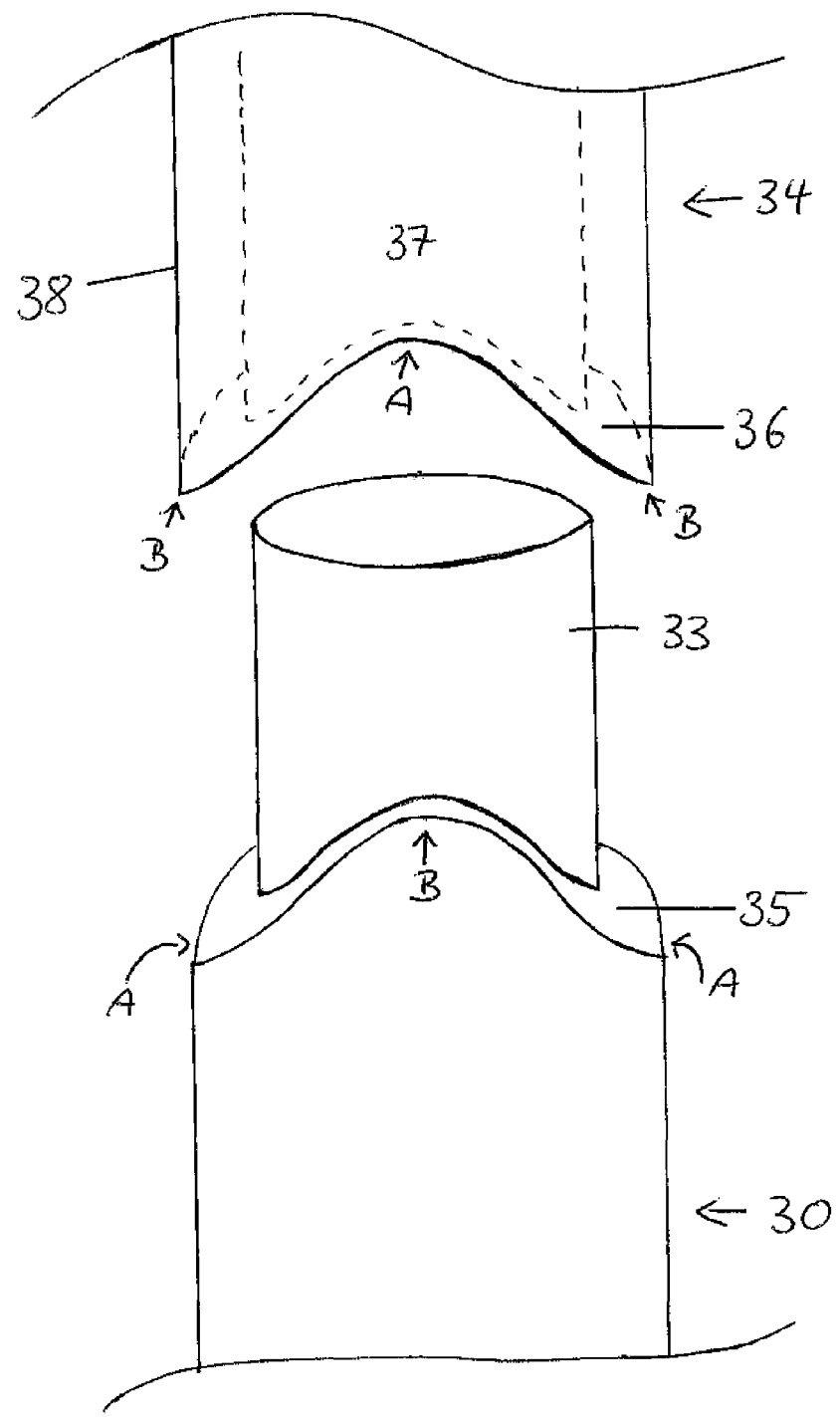
FIG. 7 shows a side view of a hinge for the lateral doors of the cleaning trolley.

FIG. 7 shows a side view of a hinge for the lateral doors of the cleaning trolley. The lateral doors are provided with hinges comprising a fixed hinge leaf 30 (shown partly) and a moving hinge leaf 34 (shown partly). The hinges are constructed to be self-closing by the provision of two rest positions separated from each other by 180°. The two rest positions of the hinges are determined by an uneven or weavy profile of the support flange 35 from which the hinge pin 33 of the fixed hinge leaf 30 protrudes and by the uneven profile of the rim 36 surrounding the hinge hole 37 of the hinge pin bushing 38 of the moving hinge leaf 34. Due to this construction the two uneven or weavy profiles contain two opposite lowest points (A) separated by peaks (B) matching to each other, which results in a movement of the door towards one of the two possible rest positions.

The invention claimed is:
1. A cleaning trolley, comprising:
   A. a first modular unit, comprising:
      (i) a first base plate;
      (ii) at least four first upright hollow profiles for fixing first cross walls arranged on the first base plate, each of the four first upright hollow profiles including at least one groove,
      wherein each first cross wall consists of two first wall elements removably arranged back-to-back to each other to form two first opposed edges, each first opposed edge defined by an area with reduced thickness and a terminal beaded edge shaped to be fixably inserted into the groove of one of the four first upright hollow profiles; and
      (iii) a first upper frame for securing the at least four first upright hollow profiles, B. a second modular unit, comprising:
      (i) a second base plate;
      (ii) at least four second upright hollow profiles for fixing second cross walls arranged on the second base plate, each of the four second upright hollow profiles including at least one groove, wherein each second cross wall consists of two second wall elements removably arranged back-to-back to each other to form two second opposed edges, each second opposed edge defined by an area with reduced thickness and a terminal beaded edge shaped to be fixably inserted into the groove of one of the four second upright hollow profiles; and (iii) a second upper frame for securing the at least four second upright hollow profiles;

wherein the first modular unit is removably connected to the second modular unit via a connection mechanism, wherein the connection mechanism is released by actuation of a pedal element, and further wherein the modular units are independently mobile.

2. The cleaning trolley according to claim 1, wherein at least one of the first wall elements includes one or more seats, each of the one or more seats including a slot and a hole, and wherein a support plate for an element to be fixed to the cleaning trolley includes a tongue arranged along one edge of the support plate for insertion into the slot of one of the seats; and a drop-in pin arranged at the back of the support plate for a snap-fit insertion into the hole of one of the seats.

3. The cleaning trolley of claim 1 wherein the first modular unit includes two first crosswalls arranged opposite each other to form a drawer cabinet, and wherein one of the two first wall elements of each of the two first crosswalls includes a plurality of rails for guiding one or more drawers.

4. The cleaning trolley according to claim 1, wherein the first modular unit and the second modular unit further include lateral doors having hinges comprised of a fixed hinge leaf and a moving hinge leaf which is integral with the door, and wherein the hinges are self-closing and provide two rest positions separated from each other by 180°.

5. The cleaning trolley according to claim 4, wherein the two rest positions of the hinges are determined by an uneven profile of a support flange from which a hinge pin of the fixed hinge leaf protrudes and by an uneven profile of a rim surrounding a hinge hole of a hinge pin bushing of the moving hinge leaf, and wherein the uneven profile of the support flange and the uneven profile of the rim each include two opposite lowest points separated by peaks that are substantially complementary to each other and provide a mating interface.

6. The cleaning trolley according to claim 4, wherein the fixed hinge leaf comprises a flat section with a drop-in pin for a snap-fit insertion into a hole of one of the four first upright hollow profiles and an extension having a shape of a cramp for an enveloping grip with the edge of the one of the four first upright hollow profiles.

7. The cleaning trolley according to claim 1, wherein the first modular unit further includes a handle bar provided with one or more braces configured for removable attachment to one of the two first wall elements.

8. The cleaning trolley according to claim 7, wherein the braces include the handle bar at a height of from 50 to 200 cm above floor level.

9. The cleaning trolley according to claim 1, wherein at least one of the first upper frame and the second upper frame include an upper lid assembly comprising a frame and horizontally arranged sliding lids connected thereto for covering the top side of the trolley.

10. The cleaning trolley of claim 1 wherein each of the two first wall elements includes at least one seat, each seat configured to receive a support plate including one of a hook, a handle, a flat surface, and a clamp for holding a mop handle.

11. The cleaning trolley according to claim 3, wherein the one or more drawers include at least one of a tablet, a first drawer, a second drawer having 1.5 to 2.0 fold of a height of the first drawer and a third drawer having a smaller height than the first drawer.

12. The cleaning trolley of claim 1 wherein the first modular unit includes three first crosswalls arranged to form two drawer cabinets.

13. The cleaning trolley of claim 1 wherein at least one of the first modular unit and the second module unit includes a drawer cabinet.

* * * * *